US009449249B2

(12) United States Patent
Tsai et al.

(10) Patent No.: US 9,449,249 B2
(45) Date of Patent: Sep. 20, 2016

(54) METHOD AND APPARATUS FOR ENHANCING VISUAL SEARCH

(71) Applicants: Nokia Corporation, Espoo (FI); Board of Trustees of the Leland Stanford Junior University, Palo Alto, CA (US)

(72) Inventors: Shang-Hsuan Tsai, Stanford, CA (US); David Chen, Mountain View, CA (US); Gabriel Takacs, Santa Clara, CA (US); Radek Grzeszczuk, Menlo Park, CA (US); Vijay Chandrasekhar, Stanford, CA (US); Bernd Girod, Stanford, CA (US)

(73) Assignees: Nokia Corporation, Espoo (FI); The Board of Trustees of the Leland Stanford Junior University, Palo Alto, CA (US)

( * ) Notice: Subject to any disclaimer, the term of this patent is extended or adjusted under 35 U.S.C. 154(b) by 96 days.

(21) Appl. No.: 13/755,748

(22) Filed: Jan. 31, 2013

(65) Prior Publication Data
US 2013/0195358 A1     Aug. 1, 2013

Related U.S. Application Data

(60) Provisional application No. 61/593,061, filed on Jan. 31, 2012.

(51) Int. Cl.
| | | |
|---|---|---|
| G06K 9/00 | (2006.01) |
| G06K 9/46 | (2006.01) |
| G06T 9/00 | (2006.01) |
| H04N 19/463 | (2014.01) |
| H04N 19/91 | (2014.01) |

(52) U.S. Cl.
CPC ............ *G06K 9/4642* (2013.01); *G06T 9/00* (2013.01); *G06T 9/005* (2013.01); *H04N 19/463* (2014.11); *H04N 19/91* (2014.11)

(58) Field of Classification Search
None
See application file for complete search history.

(56) References Cited

U.S. PATENT DOCUMENTS 7,949,186 B2 *   5/2011   Grauman et al. ............. 382/170
8,457,400 B2 *   6/2013   Wu et al. ...................... 382/170
(Continued)

OTHER PUBLICATIONS

"Location Coding for Mobile Image Retrieval," Sam S. Tsai, et al, Proceedings of the 5th International ICST Mobile Multimedia Communications Conference, 2009, 7 pages.*

(Continued)

*Primary Examiner* — Wenpeng Chen
(74) *Attorney, Agent, or Firm* — Alston & Bird LLP

(57) ABSTRACT

Various methods are described for improving the compression of location information during a visual search. One example method may comprise identifying one or more features of a source query image for a visual search. The method may further comprise generating a histogram map comprising one or more histogram bins, wherein the histogram map represents the location of the one or more features of the source query image. Additionally, the method may comprise generating a context for at least one of the one or more histogram bins, wherein the context comprises a first context value based on information related to one or more neighboring bins located a first distance from the respective histogram bin and a second context value based on information related to one or more neighboring bins located a second distance from the respective histogram bin. Similar and related methods, apparatuses, and computer program products are also provided.

20 Claims, 13 Drawing Sheets

(56) References Cited

U.S. PATENT DOCUMENTS

| | | | |
|---|---|---|---|
| 8,571,306 B2* | 10/2013 | Reznik et al. | 382/154 |
| 2006/0120590 A1* | 6/2006 | Han et al. | 382/154 |
| 2007/0217676 A1* | 9/2007 | Grauman et al. | 382/170 |
| 2009/0052786 A1* | 2/2009 | Gross et al. | 382/209 |
| 2009/0324077 A1* | 12/2009 | Wu et al. | 382/170 |
| 2010/0272366 A1* | 10/2010 | Meng et al. | 382/190 |
| 2012/0257834 A1* | 10/2012 | Gross et al. | 382/209 |
| 2013/0039566 A1* | 2/2013 | Reznick et al. | 382/154 |

OTHER PUBLICATIONS

Tsai, S. S. et al., *Mobile Product Recognition*, MM'10, Firenze, Italy (Oct. 25-29, 2010) 4 pages.

Amazon Mobile for iPhone [online] [retrieved Oct. 16, 2015]. Retrieved from the Internet: <URL: http://www.amazon.com/gp/feature.html?docId=1000291661>. (dated 1996-2015) 2 pages.

Search for pictures with Google Goggles—Search Help [online] [retrieved Oct. 16, 2015]. Retrieved from the Internet: <URL: https://supportgoogle.com/websearch/answer/166331> (undated) 1 page.

G. Francini, S. Lepsoy, M. Balestri, G. Cordara, "Telecom Italia's response to the MPEG CfP for Visual Search", MPEG document M22672, Nov. 2011 (10 pages).

G. Francini, S. Lepsoy, M. Balestri, "Description of Test Model under Consideration for CDVS", MPEG document N12367, Dec. 2011 (24 pages).

* cited by examiner

METHOD AND APPARATUS FOR ENHANCING VISUAL SEARCH

CROSS REFERENCE TO RELATED APPLICATION

This application is a non-provisional of and claims priority to U.S. Provisional Application No. 61/593,061, filed on Jan. 31, 2012, the entire contents of which are hereby incorporated herein by reference.

TECHNICAL FIELD

Embodiments of the present invention relate generally to communication technology, and, more particularly, relate to a method and apparatus for improving the compression of location information during a visual search.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

One area where consumer demand has rapidly increased involves mobile visual search, that is, the use of an image as a source for a search query. For example, an image may be transmitted from a mobile device to a server to be used for performing a search in a database controlled by the server. Sending the entire image to the server consumes significant resources such as network bandwidth, transmission time, and device power. To improve the efficiency of the search and reduce the amount of resources utilized to perform the search, a representation of the image may be transmitted rather than the entire image. Current methods for generating an image representation, however, still result in inefficient results and wasted resources.

Furthermore, the image representation is typically stored by both the mobile device and the server. Current methods for compressing the image representation are inefficient. As a result, the image representation may be generated to include less information about the image due to the limited storage space.

Accordingly, it may be desirable to provide systems, methods, apparatuses, and computer program products for improving the generation and compression of location information during a visual search in order to reduce the size of the image representation to be stored by a mobile device and transmitted to a server.

SUMMARY

Methods, apparatuses, and computer program products are herein provided for improving the compression of location information during a visual search. In an example embodiment, a method is provided, comprising identifying one or more features of a source query image for a visual search; generating a histogram map comprising one or more histogram bins, wherein the histogram map represents the location of the one or more features of the source query image; and generating a context for at least one of the one or more histogram bins, wherein the context comprises a first context value based on information related to one or more neighboring bins located a first distance from the respective histogram bin and a second context value based on information related to one or more neighboring bins located a second distance from the respective histogram bin.

In another example embodiment, an apparatus comprising at least one processor and at least one memory storing computer program code is provided. The at least one memory and stored computer program code are configured, with the at least one processor, to cause the apparatus of this example embodiment to at least identify one or more features of a source query image for a visual search; generate a histogram map comprising one or more histogram bins, wherein the histogram map represents the location of the one or more features of the source query image; and generate a context for at least one of the one or more histogram bins, wherein the context comprises a first context value based on information related to one or more neighboring bins located a first distance from the respective histogram bin and a second context value based on information related to one or more neighboring bins located a second distance from the respective histogram bin.

In yet another example embodiment, a computer program product is provided. The computer program product of this example embodiment includes at least one computer-readable storage medium having computer-readable program instructions stored therein. The program instructions of this example embodiment comprise program instructions configured to identify one or more features of a source query image for a visual search; generate a histogram map comprising one or more histogram bins, wherein the histogram map represents the location of the one or more features of the source query image; and generate a context for at least one of the one or more histogram bins, wherein the context comprises a first context value based on information related to one or more neighboring bins located a first distance from the respective histogram bin and a second context value based on information related to one or more neighboring bins located a second distance from the respective histogram bin.

In another example embodiment, an apparatus is provided, which comprises means for identifying one or more features of a source query image for a visual search; generating a histogram map comprising one or more histogram bins, wherein the histogram map represents the location of the one or more features of the source query image; and generating a context for at least one of the one or more histogram bins, wherein the context comprises a first context value based on information related to one or more neighboring bins located a first distance from the respective histogram bin and a second context value based on information related to one or more neighboring bins located a second distance from the respective histogram bin.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described some example embodiments of the invention in general terms, reference will now be made to the accompanying drawings, which are not necessarily drawn to scale, and wherein:

Figure 5A:
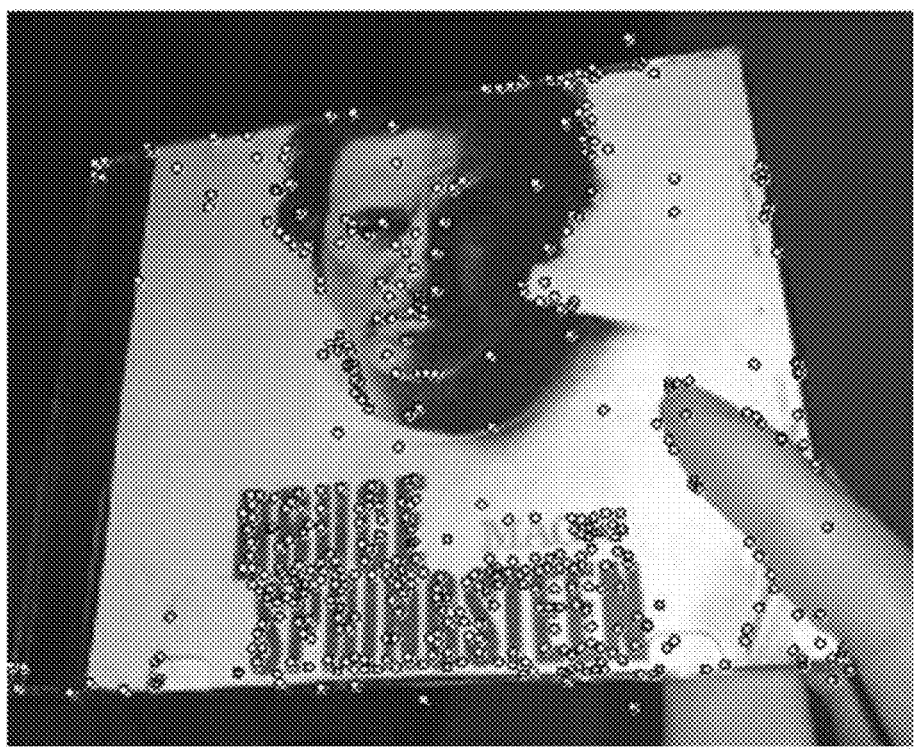
Figure 5B:
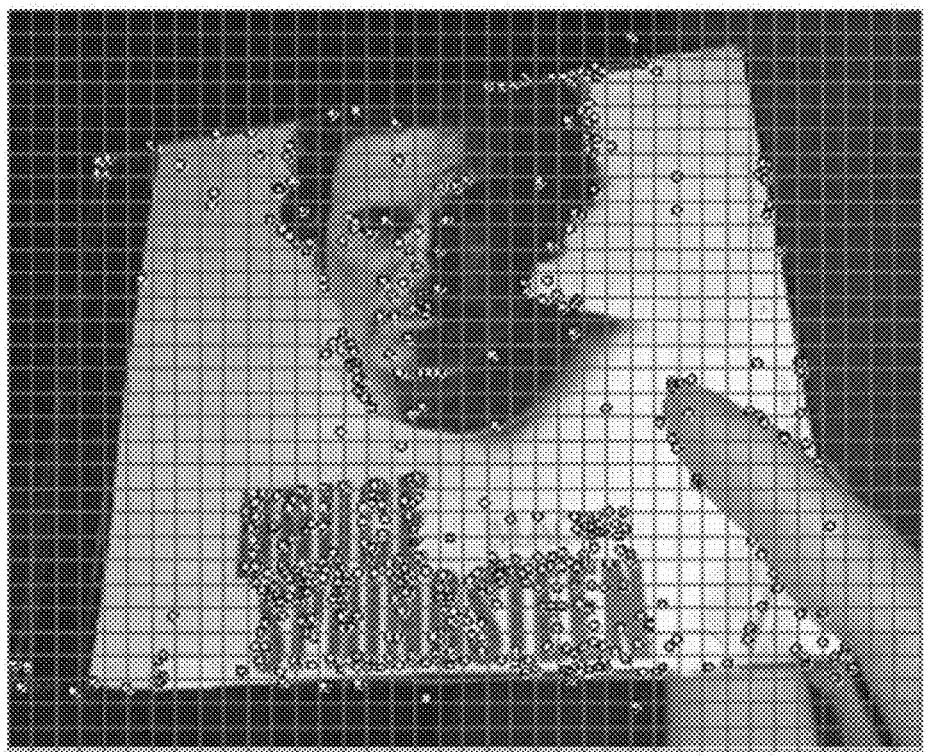
Figure 5C:
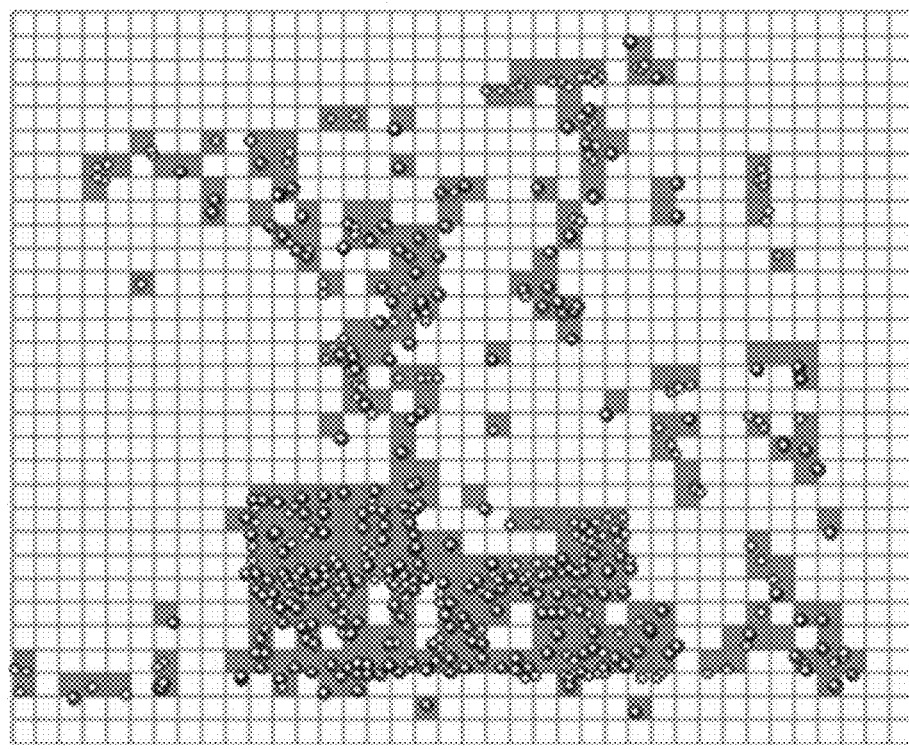
Figure 6A:
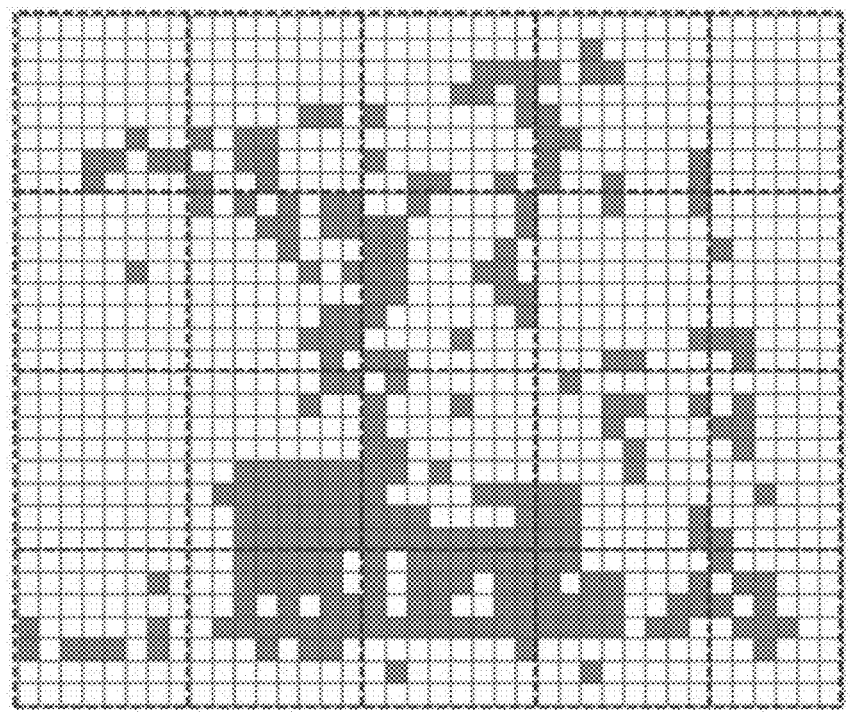
Figure 6B:
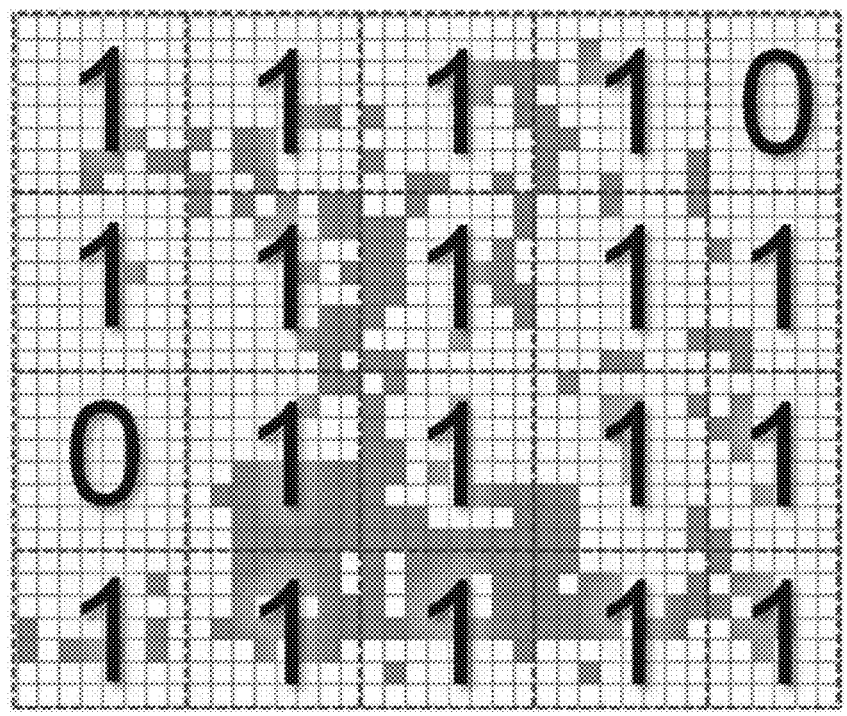
Figure 7A:
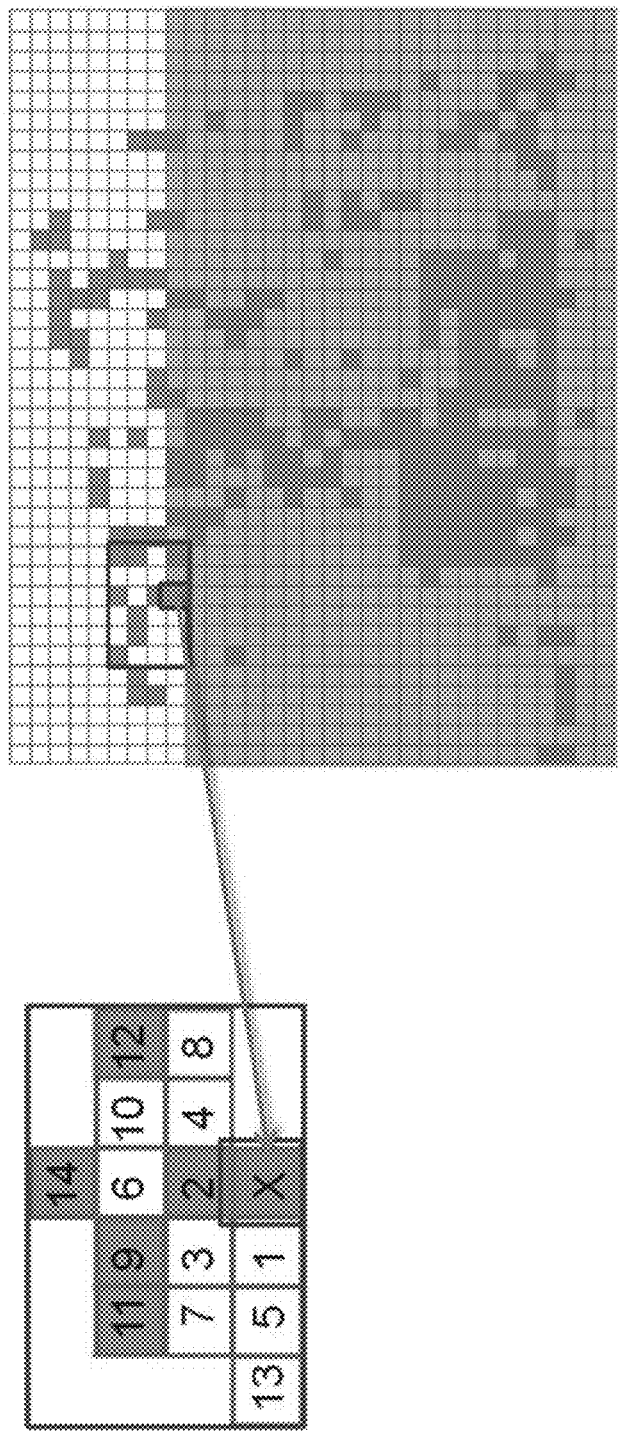
Figure 7B:
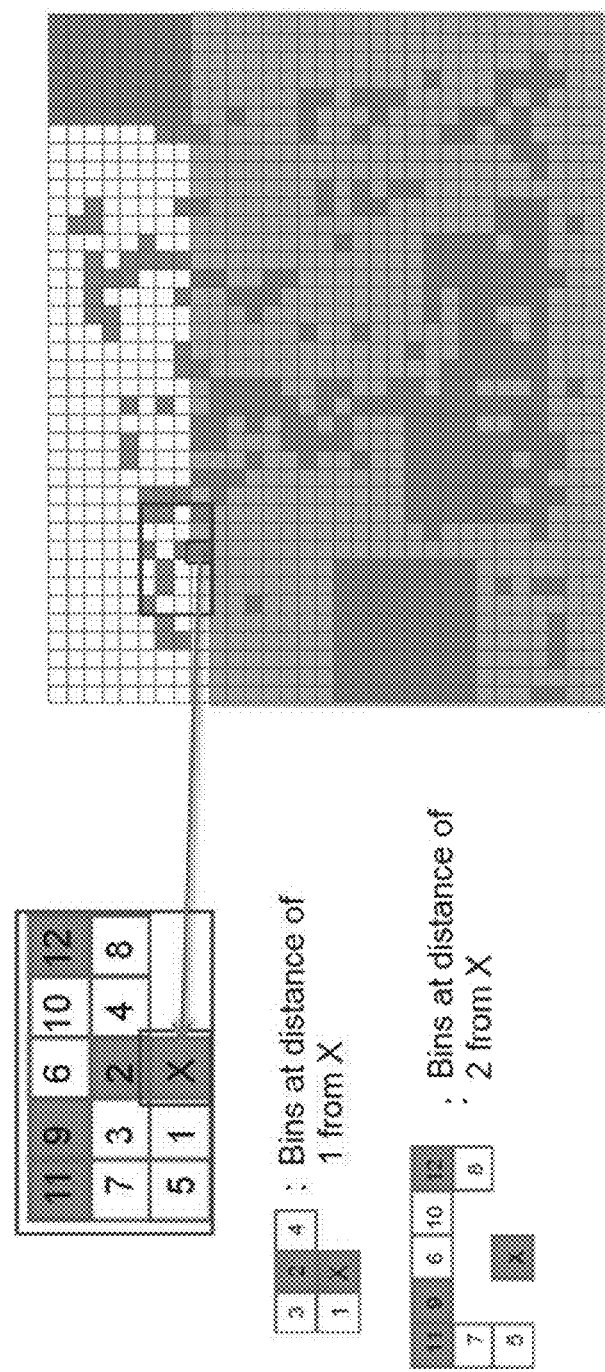
Figure 8A:
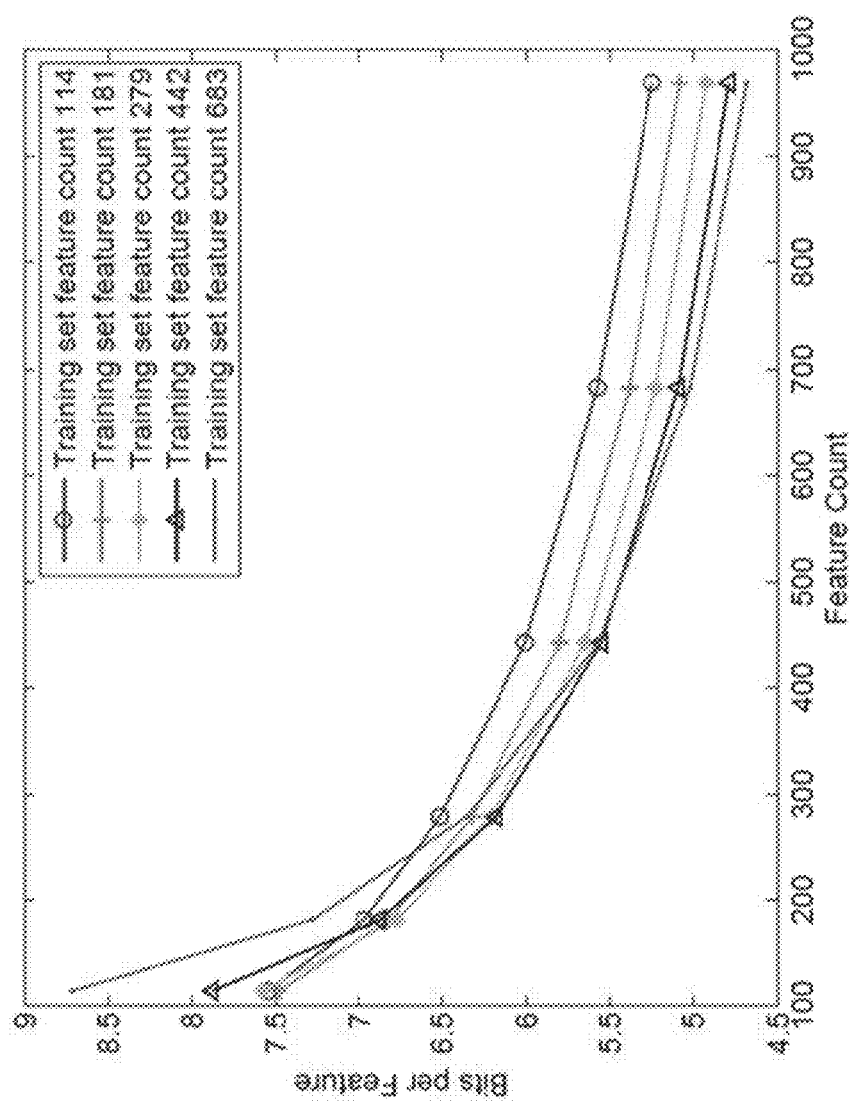
Figure 8B:
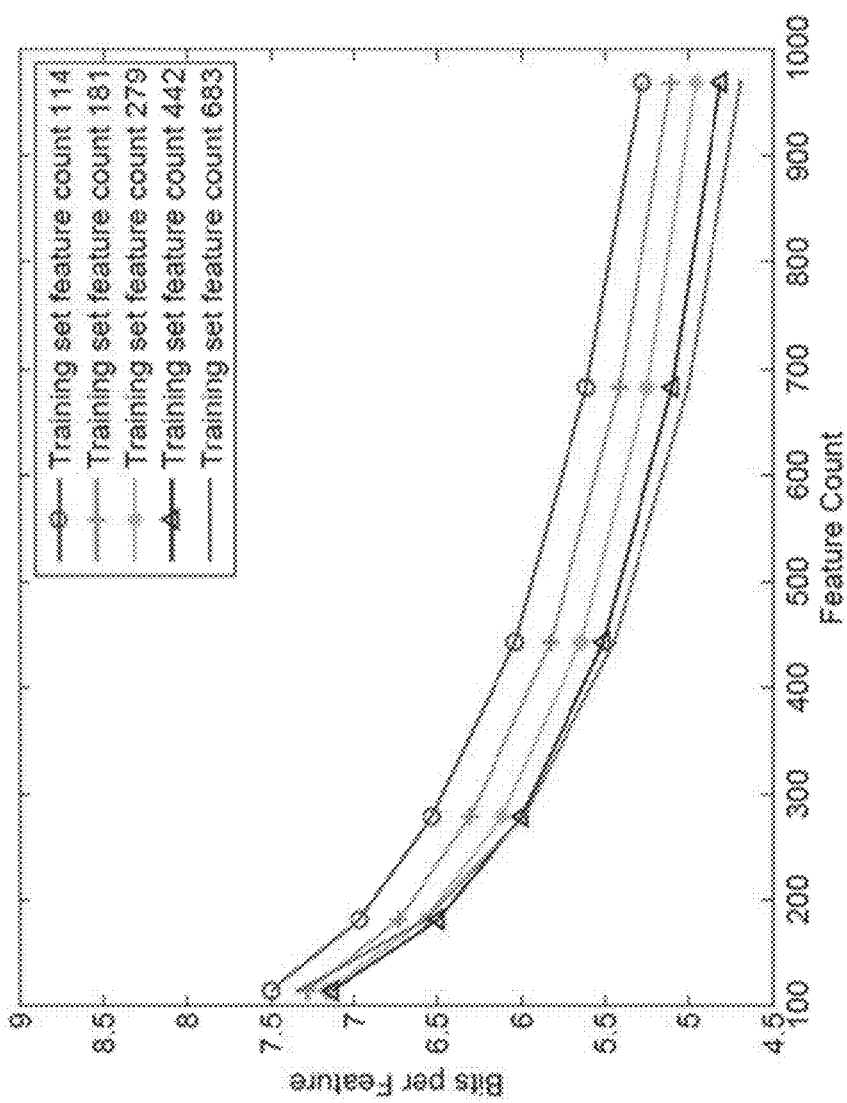

FIGS. 5a-c illustrate an example method for generating a location histogram;

FIGS. 6a-b illustrate an example method for performing multi-size block coding;

FIGS. 7a-b illustrate context modeling techniques according to some example embodiments of the present invention; and FIGS. 8a-b illustrate encoding performance over a wide range of feature counts according to example embodiments of the present invention.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

The terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

Figure 1:
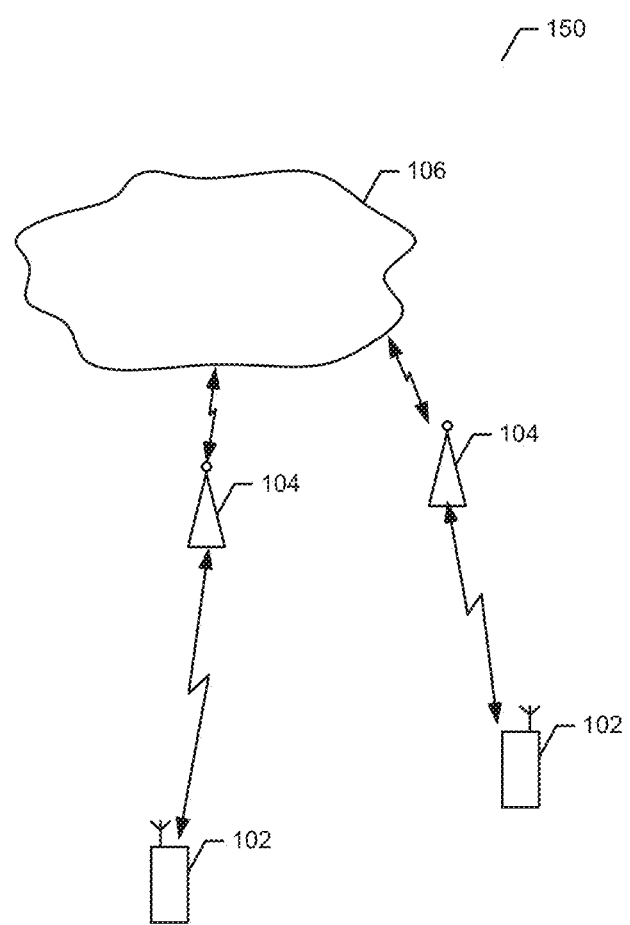
FIG. 1 illustrates a system for improving the compression of location information during a visual search according to some example embodiments of the present invention.

Referring now to FIG. 1, FIG. 1 illustrates a block diagram of a system 150 for improving the compression of location information during a visual search according to an example embodiment. It will be appreciated that the system 150 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for improving the compression of location information during a visual search, numerous other configurations may also be used to implement embodiments of the present invention.

The system 150 may include one or more terminal apparatuses 102 and one or more serving network apparatuses 104. The system 150 may further comprise a network 106. The network 106 may comprise one or more wireline networks, one or more wireless networks, or some combination thereof. The network 106 may, for example, comprise a serving network (e.g., a serving cellular network) for one or more terminal apparatuses 102. The network 106 may comprise, in certain embodiments, one or more of the terminal apparatuses 102 and serving network apparatuses 104 themselves. According to example embodiments, the network 106 may comprise the Internet. The network 106 may comprise, in some embodiments, a Content Delivery Network (CDN), which may also be referred to as a Content Distribution Network. In various embodiments, the network 106 may comprise a wired access link connecting one or more terminal apparatuses 102 to the rest of the network 106 using, for example, Digital Subscriber Line (DSL) technology. In some embodiments, the network 106 may comprise a public land mobile network (for example, a cellular network), such as may be implemented by a network operator (for example, a cellular access provider). The network 106 may operate in accordance with universal terrestrial radio access network (UTRAN) standards, evolved UTRAN (E-UTRAN) standards, current and future implementations of Third Generation Partnership Project (3GPP) LTE (also referred to as LTE-A) standards, current and future implementations of International Telecommunications Union (ITU) International Mobile Telecommunications—Advanced (IMT-A) systems standards, and/or the like. It will be appreciated, however, that where references herein are made to a network standard and/or terminology particular to a network standard, the references are provided merely by way of example and not by way of limitation.

According to various embodiments, one or more terminal apparatuses 102 may be configured to connect directly with one or more serving network apparatuses 104 via, for example, an air interface without routing communications via one or more elements of the network 106. Alternatively, one or more of the terminal apparatuses 102 may be configured to communicate with one or more of the serving network apparatuses 104 over the network 106. In this regard, the serving network apparatuses 104 may comprise one or more nodes of the network 106. For example, in some example embodiments, the serving network apparatuses 104 may be at least partially embodied on one or more computing devices that comprise an element of a radio access network (RAN) portion of the network 106. In this regard, the serving network apparatuses 104 may, for example, be at least partially embodied on an access point of the network 106 (for example, a macrocell, microcell, picocell, femtocell, closed subscriber group (CSG) cell, base station, base transceiver station (BTS), node B, evolved node B, access point (AP), group owner, mesh station (STA), mesh point, and/or the like), which may, for example be configured to provide access to the network 106 (e.g., via a radio uplink) to one or more of the terminal apparatuses 102. Accordingly, each of the serving network apparatuses 104 may comprise a network node or a plurality of network nodes collectively configured to perform one or more operations attributed to the serving network apparatus 104 as described with respect to various example embodiments disclosed herein.

A terminal apparatus 102 may be embodied as any computing device, such as, for example, a desktop computer, laptop computer, mobile terminal, mobile computer, mobile phone, mobile communication device, tablet computing device, game device, digital camera/camcorder, audio/video player, television device, radio receiver, digital video recorder, positioning device, wrist watch, portable digital assistant (PDA), fixed transceiver device (e.g., attached to traffic lights, energy meters, light bulbs, and/or the like), a chipset, an apparatus comprising a chipset, any combination thereof, and/or the like.

Figure 2:
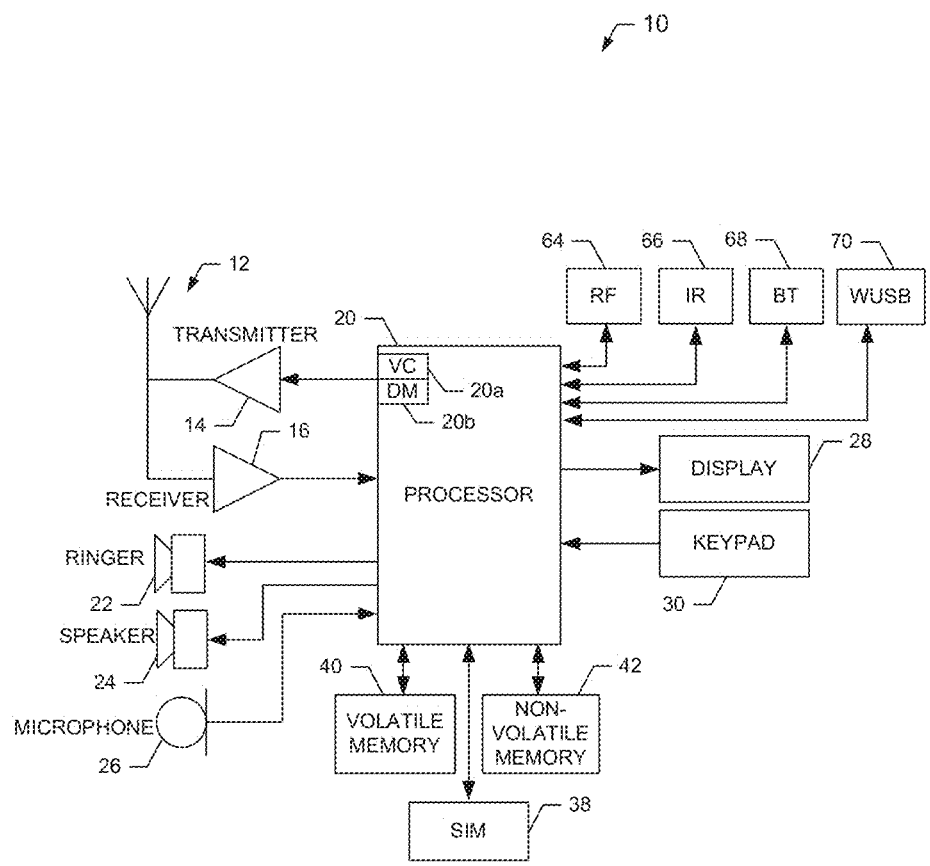
FIG. 2 illustrates a schematic block diagram of a mobile terminal according to some example embodiments of the present invention.

In some example embodiments, a terminal apparatus 102 may be embodied as a mobile terminal, such as that illustrated in FIG. 2. In this regard, FIG. 2 illustrates a block diagram of a mobile terminal 10 representative of one embodiment of a terminal apparatus 102. It should be understood, however, that the mobile terminal 10 illustrated and hereinafter described is merely illustrative of one type of computing device (i.e., terminal apparatus 102) that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Bluetooth™ (BT), Ultra-wideband (UWB), Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols such as LTE Advanced and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX™) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to low power/energy or ultra-low power/energy Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The mobile terminal 10 may comprise memory, such as a removable or non-removable subscriber identity module (SIM) 38, a soft SIM 38, a fixed SIM 38, a removable or non-removable universal subscriber identity module (USIM) 38, a soft USIM 38, a fixed USIM 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may comprise a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
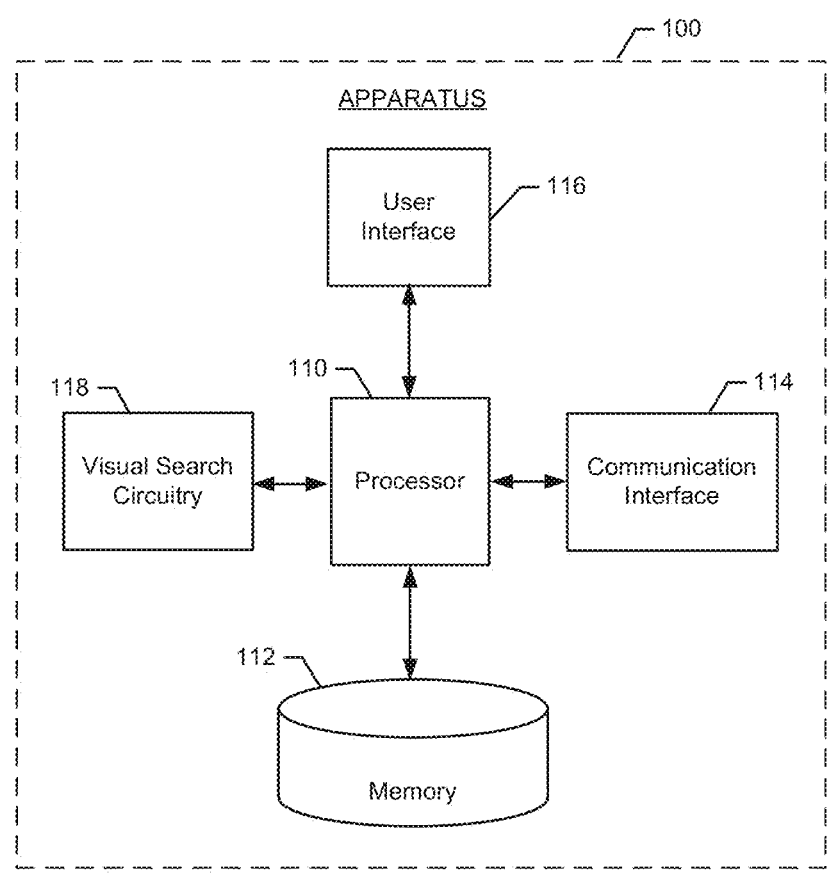
FIG. 3 illustrates a block diagram of an apparatus according to some example embodiments of the present invention.

In various embodiments, for example, a terminal apparatus 102 and/or a serving network apparatus 104 may be embodied as or otherwise include an apparatus 100 as generically represented by the block diagram of FIG. 3. In the example embodiment, the apparatus 100 may comprise various means for performing the various functions herein described. These means may comprise one or more of a processor 110, memory 112, communication interface 114, user interface 116, or visual search circuitry 118. The means of the apparatus 100 as described herein may be embodied as, for example, circuitry, hardware elements (e.g., a suitably programmed processor, combinational logic circuit, and/or the like), a computer program product comprising computer-readable program instructions (e.g., software or firmware)

stored on a computer-readable medium (e.g., memory 112) that is executable by a suitably configured processing device (e.g., the processor 110), or some combination thereof.

In some example embodiments, one or more of the means illustrated in FIG. 3 may be embodied as a chip or chip set. In other words, the apparatus 100 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 110, memory 112, communication interface 114, user interface 116, and/or visual search circuitry 118 may be embodied as a chip or chip set. The apparatus 100 may therefore, in some example embodiments, be configured to implement embodiments of the present invention on a single chip or as a single "system on a chip." As another example, in some example embodiments, the apparatus 100 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some embodiments the processor 110 may comprise a plurality of processors. The plurality of processors may be in operative communication with each other and may be collectively configured to perform one or more functionalities of the apparatus 100 as described herein. The plurality of processors may be embodied on a single computing device or distributed across a plurality of computing devices collectively configured to function as the apparatus 100. In embodiments wherein the apparatus 100 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the apparatus 100 to perform one or more of the functionalities of the apparatus 100 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise one or more tangible and/or non-transitory computer-readable storage media that may include volatile and/or non-volatile memory. Although illustrated in FIG. 3 as a single memory, the memory 112 may comprise a plurality of memories. The plurality of memories may be embodied on a single computing device or may be distributed across a plurality of computing devices collectively configured to function as the apparatus 100. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 100 is embodied as a mobile terminal 10, the memory 112 may comprise the volatile memory 40 and/or the non-volatile memory 42. The memory 112 may be configured to store information, data, applications, instructions, or the like for enabling the apparatus 100 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the visual search circuitry 118 during the course of performing its functionalities.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to another computing device. In an example embodiment, the communication interface 114 may be at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 100 and one or more computing devices or computing resources may be in communication. As an example, the communication interface 114 may be configured to enable communication between the apparatus 100 and another device, such as another terminal apparatus 102 or serving network apparatus 104. As a further example, the communication interface 114 may be configured to enable communication with another terminal apparatus 102 or serving network apparatus 104 via the network 106. The communication interface 114 may additionally be in communication with the memory 112, user interface 116, and/or visual search circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive indication of a touch gesture or other input to the touch screen display. The user interface 116 may be in communication with the memory 112, communication interface 114, and/or visual search circuitry 118, such as via a bus.

The visual search circuitry 118 may be embodied as various means, such as circuitry, hardware, a computer program product comprising computer readable program instructions stored on a computer readable medium (for example, the memory 112) and executed by a processing device (for example, the processor 110), or some combination thereof and, in some embodiments, is embodied as or otherwise controlled by the processor 110. In embodiments wherein the visual search circuitry 118 is embodied separately from the processor 110, the visual search circuitry 118 may be in communication with the processor 110. The visual search circuitry 118 may further be in communication with one or more of the memory 112, communication interface 114, or user interface 116, such as via a bus.

Figure 4:
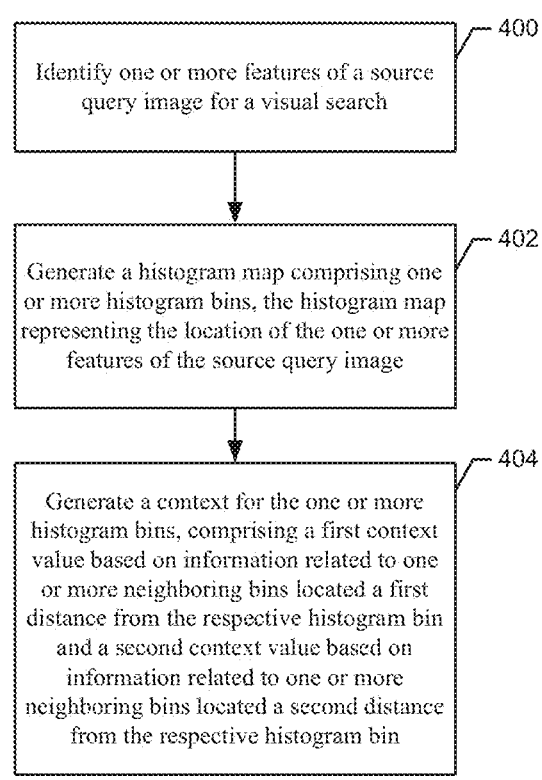
FIG. 4 illustrates a flowchart according to an example method for improving the compression of location information during a visual search according to some example embodiments of the present invention.

FIG. 4 is a flowchart illustrating the operations performed by a method, apparatus, and computer program product, such as apparatus 100 of FIG. 3, from the perspective of a terminal apparatus 102 in accordance with one embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 112 of an apparatus 100 employing an embodiment of the present invention and executed by a processor 110 in the apparatus, in some instances via visual search circuitry 118.

As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

As such, the operations of FIG. 4, when executed, convert a computer or processing circuitry into a particular machine configured to perform an example embodiment of the present invention. Accordingly, the operations of FIG. 4 define an algorithm for configuring a computer or processing circuitry, e.g., processor 110, to perform an example embodiment. In some cases, a general purpose computer may be provided with an instance of the processor which performs the algorithm of FIG. 4 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein.

Referring now to FIG. 4, the operations performed by a method, apparatus and computer program product of an example embodiment are illustrated from the perspective of an apparatus 100 embodied as a terminal apparatus 102 that improves the compression of location information of query features in a query image during a visual search. In this regard, an image may be captured or selected for use as a query image in a visual search.

The apparatus 100 embodied by the terminal apparatus 102 may include means, such as the visual search circuitry 118, the processor 110 or the like, for detecting one or more features in a query image. See block 400 of FIG. 4. FIG. 5a illustrates an example image comprising one or more identified features 500. The one or more features 500 may provide information for identifying the query image with an image representation.

According to example embodiments, the apparatus 100, such as the visual search circuitry 118 or the processor 110, may be configured to generate a spatial histogram of the image. In this regard, the spatial histogram may divide the image into multiple bins. For example, the spatial histogram may comprise a spatial grid of n by m bins covering the query image. Each of the one or more features of the query image may be contained by one or more of the spatial histogram bins. FIG. 5b illustrates an example image comprising a spatial histogram containing the one or more detected features of FIG. 5a.

The apparatus 100, such as the visual search circuitry 118 or the processor 110, in example embodiments, may be configured to generate a location histogram. In this regard, the location histogram may be generated by first identifying whether each bin of the spatial histogram contains one or more features of the query image. The location histogram may be represented by a histogram map and a histogram count. The histogram map may indicate which bins are empty or not empty, that is, which bins contain one or more features and which bins contain no features. See block 402 of FIG. 4. In some instances, the apparatus may assign a bin binary value to each bin of the histogram map. For example, a bin containing one or more features may be assigned a bin binary value of one, and a bin containing no features may be assigned a bin binary value of zero. FIG. 5c illustrates an example location histogram map where non-empty bins are shaded. The histogram count may then indicate the number of features contained within each bin of the histogram map. The location histogram may subsequently be compressed using one or more of the following methods, such as multi-size block (or group) encoding and/or occupancy-based context model encoding.

In a typical encoding of the histogram map, a bit stream may be generated indicating the bin binary value for each bin of the histogram map in a particular order (e.g., raster order). FIG. 8a illustrates a graph demonstrating the performance for encoding of query sets over a wide range of feature counts according to the typical method. As is evident in FIG. 8a, performance works well in instances where the query set has a matched feature count with the training set feature count. Multi-sized block encoding may improve the typical encoding (e.g., reduce the length or complexity of the encoding) by considering the bin binary values in groups. In this regard, according to example embodiments, the apparatus 100, such as the visual search circuitry 118 or the processor 110, may be configured to combine the bins of the histogram map into one or more groups. In this regard, the histogram map may be divided into one or more x by y groups, each containing x times y bins. In some embodiments, the multi-size block encoding may comprise adaptive-size block encoding. In this regard, the apparatus may use adaptive-size block encoding to determine the size of the groups (i.e., the x and y values). For example, the apparatus may determine the group size based on the number of features within the query image. FIG. 6a illustrates an example histogram map comprising one or more groups. Additionally, FIG. 8b illustrates a graph demonstrating the performance for encoding of query sets over a wide range of feature counts according to the multi-size block encoding method. As is evident in FIG. 8b, performance works well even in instances where the query set feature count does not match the training set feature count.

The apparatus 100, such as the visual search circuitry 118 or the processor 110, may be further configured, in various embodiments, to identify whether each group of the histogram map contains one or more bins containing one or more features of the query image, that is, whether any bin in the group has a bin binary value of one. In some instances, the apparatus may assign a group binary value to each group of the histogram map. For example, a group that contains one or more bins containing a feature may be assigned a group binary value of one, and a group containing no bins containing a feature may be assigned a group binary value of zero. FIG. 6b illustrates an example histogram map comprising one or more groups, each group having an assigned group binary value. The apparatus 100, such as the visual search circuitry 118 or the processor 110, may be configured to generate a bit code for representing the histogram map from the group binary values. For example, the bit code may be generated by combining the group binary value from each group in raster order, that is, horizontally across each row from left to right and top to bottom. In certain embodiments, the bit code may be further encoded, for example using an entropy coder or source coder.

After generating the bit code for representing the histogram map, using either the bin binary values or group binary values, the apparatus 100, such as the visual search circuitry 118 or the processor 110, in various embodiments, may be configured to generate a context for encoding the individual location histogram bins. In this regard, the apparatus may be configured to generate the context according to a context model, such as an occupancy-based context model. The apparatus may then encode the bin, for example with an entropy encoder, using the associated generated context. In some instances, the context may be generated for each individual bin in raster order. In an instance in which the bins have been multi-size block encoded, the apparatus may ignore, or skip, the bins in those groups having a zero value, that is those groups containing no bins that contain any features. In this regard, the apparatus may not generate a context for any bins contained in a group and, in certain instances, may not encode the individual bins in those groups. For example, the bins located in the two groups assigned a value of zero in FIG. 6b will neither have a context generated nor be encoded. In some embodiments, the apparatus may use the generated context associated with a particular histogram bin to encode whether the histogram bin contains or does not contain any features. In other embodiments, the apparatus may use the generated context associated with a particular histogram bin to encode the number of features contained within the histogram bin.

According to various embodiments, the apparatus may generate a context for and encode a particular bin, X, based on information related to one or more neighboring bins. FIG. 7a illustrates an example bin X, for which a context may be generated for encoding the bin using information from the fourteen numbered neighboring bins. In one embodiment, the context of bin X may be based on a representation of whether each of the fourteen bins is either empty (i.e., contains no features) or non-empty (i.e., contains one or more features). FIG. 7a represents non-empty bins with a shaded background. In this embodiment, the context space may therefore comprise $2^{14}$ possible combinations for representing the state (i.e., empty or non-empty; 0 or 1) of all of the fourteen neighboring bins.

In another embodiment, the context space may be significantly reduced by using a context model that relies on an alternative representation of the state of the neighboring bins. The apparatus 100, such as the visual search circuitry 118 or the processor 110, may generate a first representation of those neighboring bins of a first distance (e.g., one) from the bin being encoded, namely X. For example, in FIG. 7b the bins at a distance of one from bin X may comprise the bins numbered one (1) through four (4). The apparatus may then generate a second representation of those neighboring bins of a second distance (e.g., two) from the bin being encoded, namely X. For example, in FIG. 7b the bins at a distance of two from bin X may comprise the bins numbered five (5) through twelve (12). See block 404 of FIG. 4. The first representation, in some instances, may comprise a first count of the number of non-empty bins at the first distance, and the second representation may comprise a second count of the number of non-empty bins at the second distance. For example, in FIG. 7b, the first count would be one (1) (i.e., bin two (2) only), and the second count would be three (3) (i.e., bins nine (9), eleven (11), and twelve (12)). The first and second counts may then be used as the context for encoding bin X. In other embodiments, the first count may comprise a total of the number of features contained within the neighboring bins of a first distance, and the second count may comprise a total of the number of features contained within the neighboring bins of a second distance.

The apparatus 100, such as the visual search circuitry 118 or the processor 110, may be configured to provide for transmission of the representation of the image to a network apparatus, such as an apparatus 100 embodied as a serving network apparatus 104. In this regard, the apparatus 100 embodied as a terminal apparatus 102 may provide for transmission of the bit code representing the histogram map and/or the representation of the bins contained in the histogram map encoded based on the generated context to an apparatus 100 embodied as a serving network apparatus 104.

The apparatus 100 embodied as a serving network apparatus 104, such as the visual search circuitry 118 or the processor 110, may be configured to receive the image representation information from the apparatus 100 embodied as a terminal apparatus 102. The apparatus 100 embodied as a serving network apparatus 104 may be configured to use the received information to construct a representation of the image. For example, the apparatus 100 embodied as a serving network apparatus 104 may be configured to reverse the one or more processes described above with respect to the apparatus 100 embodied as a terminal apparatus 102. In various embodiments, the apparatus 100 embodied as a serving network apparatus 104 may then perform an image search using the constructed image representation and, in some instances, provide the image search results to the apparatus 100 embodied as a terminal apparatus 102.

In other embodiments, the apparatus 100 embodied as a serving network apparatus 104 may perform the search using the unmodified information provided by the apparatus 100 embodied as a terminal apparatus 102. According to example embodiments, the apparatus 100 embodied as a serving network apparatus 104 may be configured to provide the apparatus 100 embodied as a terminal apparatus 102 with the information to be searched so that the apparatus 100 embodied as a terminal apparatus 102 may perform the search without sending any information to the apparatus 100 embodied as a serving network apparatus 102. In this regard, the amount of data transferred between the terminal apparatus 102 and the serving network apparatus 104 may be further reduced. For example, a user may download searchable information related to a city map for tourism so that the user may search the map information on the mobile device without a network connection.

The various example embodiments described herein may provide numerous advantages over the prior art. Certain advantageous embodiments may reduce the amount of data required to be transmitted between a terminal apparatus 102 and a serving network apparatus 104 for representing a source image for conducting an image search. In this regard, various advantageous embodiments may reduce the consumption of resources such as network bandwidth, transmission time, and device power. Additionally, example embodiments advantageously provide for compressing the location histogram associated with a source query image efficiently over a wide range of query image feature situations. Other advantageous embodiments provide for compressing the location histogram using multi-size block encoding, which may provide for scalability over a large range of feature counts. In various advantageous embodiments, the location histogram may additionally or alternatively be compressed using occupancy-based context modeling. In some advantageous embodiments, the occupancy-based context modeling may reduce the context space necessary to represent a bin of the location histogram, which may reduce the encoder size, the size of the table required to store the probability of different contexts for training the probability model, the amount of data needed to train the context, and/or the number of training samples required. Various advantageous embodiments, therefore, provide better performance and low bit rates. In other advantageous embodiments, the location information may be more efficiently compressed, thereby reducing the amount of storage space required for maintaining the location information on the terminal apparatus 102 and serving network apparatus 104.

In an example embodiment, a method is provided, comprising identifying one or more features of a source query image for a visual search; generating a histogram map comprising one or more histogram bins, wherein the histogram map represents the location of the one or more features of the source query image; and generating a context for at least one of the one or more histogram bins, wherein the context comprises a first context value based on information related to one or more neighboring bins located a first distance from the respective histogram bin and a second context value based on information related to one or more neighboring bins located a second distance from the respective histogram bin.

The method may further comprise assigning a binary value of one to each of the one or more histogram bins containing one or more features; and assigning a binary value of zero to each of the one or more histogram bins containing no features. As another example, generating a histogram map may further comprise dividing the one or more histogram bins into one or more groups. Additionally, the method may comprise assigning a binary value of one to each of the one or more groups containing at least one histogram bin containing one or more features; and assigning a binary value of zero to each of the one or more groups containing no histogram bins containing one or more features. The method may further comprise generating a bit code representation of the histogram map based at least in part on the binary value of at least one of the one or more groups. As an additional example, generating a context for at least one of the one or more histogram bins may further comprise skipping generation of a context for the one or more histogram bins contained in a group assigned a binary value of zero. The method may further comprise encoding at least one of the one or more histogram bins of the histogram map based at least in part on the context associated with the respective histogram bin. Additionally, encoding at least one of the one or more histogram bins of the histogram map based at least in part on the context associated with the respective histogram bin may further comprise at least one of encoding whether the respective histogram bin contains features based at least in part on the context and encoding the number of features contained in the respective histogram bin based at least in part on the context. As another example, the first context value may comprise a count of the one or more neighboring bins located a first distance from the respective histogram bin containing one or more features, and the second context value may comprise a count of the one or more neighboring bins located a second distance from the respective histogram bin containing one or more features. In yet another example, the first context value may comprise a count of the number of features contained in the one or more neighboring bins located a first distance from the respective histogram bin, and the second context value may comprise a count of the number of features contained in the one or more neighboring bins located a second distance from the respective histogram bin.

In another example embodiment, an apparatus comprising at least one processor and at least one memory storing computer program code is provided. The at least one memory and stored computer program code are configured, with the at least one processor, to cause the apparatus of this example embodiment to at least identify one or more features of a source query image for a visual search; generate a histogram map comprising one or more histogram bins, wherein the histogram map represents the location of the one or more features of the source query image; and generate a context for at least one of the one or more histogram bins, wherein the context comprises a first context value based on information related to one or more neighboring bins located a first distance from the respective histogram bin and a second context value based on information related to one or more neighboring bins located a second distance from the respective histogram bin.

The at least one memory and stored computer program code may further be configured, with the at least one processor, to cause the apparatus of this example embodiment to assign a binary value of one to each of the one or more histogram bins containing one or more features; and assign a binary value of zero to each of the one or more histogram bins containing no features. As another example, in order to generate a histogram map, the at least one memory and stored computer program code may be further configured, with the at least one processor, to cause the apparatus of this example embodiment to divide the one or more histogram bins into one or more groups. Additionally, the at least one memory and stored computer program code may be configured, with the at least one processor, to cause the apparatus of this example embodiment to assign a binary value of one to each of the one or more groups containing at least one histogram bin containing one or more features; and assign a binary value of zero to each of the one or more groups containing no histogram bins containing one or more features. The at least one memory and stored computer program code may be further configured, with the at least one processor, to cause the apparatus of this example embodiment to generate a bit code representation of the histogram map based at least in part on the binary value of at least one of the one or more groups. As an additional example, in order to generate a context for at least one of the one or more histogram bins, the at least one memory and stored computer program code may be further configured, with the at least one processor, to cause the apparatus of this example embodiment to skip generation of a context for the one or more histogram bins contained in a group assigned a binary value of zero. The at least one memory and stored computer program code may be further configured, with the at least one processor, to cause the apparatus of this example embodiment to encode at least one of the one or more histogram bins of the histogram map based at least in part on the context associated with the respective histogram bin. Additionally, in order to encode at least one of the one or more histogram bins of the histogram map based at least in part on the context associated with the respective histogram bin, the at least one memory and stored computer program code may be further configured, with the at least one processor, to cause the apparatus of this example embodiment to at least one of encode whether the respective histogram bin contains features based at least in part on the context and encode the number of features contained in the respective histogram bin based at least in part on the context. As another example, the first context value may comprise a count of the one or more neighboring bins located a first distance from the respective histogram bin containing one or more features, and the second context value may comprise a count of the one or more neighboring bins located a second distance from the respective histogram bin containing one or more features. In yet another example, the first context value may comprise a count of the number of features contained in the one or more neighboring bins located a first distance from the respective histogram bin, and the second context value may comprise a count of the number of features contained in the one or more neighboring bins located a second distance from the respective histogram bin.

In yet another example embodiment, a computer program product is provided. The computer program product of this example embodiment includes at least one computer-readable storage medium having computer-readable program instructions stored therein. The program instructions of this example embodiment comprise program instructions configured to identify one or more features of a source query image for a visual search; generate a histogram map comprising one or more histogram bins, wherein the histogram map represents the location of the one or more features of the source query image; and generate a context for at least one of the one or more histogram bins, wherein the context comprises a first context value based on information related to one or more neighboring bins located a first distance from the respective histogram bin and a second context value based on information related to one or more neighboring bins located a second distance from the respective histogram bin.

The program instructions of this example embodiment may further comprise program instructions configured to assign a binary value of one to each of the one or more histogram bins containing one or more features; and assign a binary value of zero to each of the one or more histogram bins containing no features. As another example, in order to generate a histogram map, the program instructions of this example embodiment may further comprise program instructions configured to divide the one or more histogram bins into one or more groups. Additionally, the program instructions of this example embodiment may comprise program instructions configured to assign a binary value of one to each of the one or more groups containing at least one histogram bin containing one or more features; and assign a binary value of zero to each of the one or more groups containing no histogram bins containing one or more features. The program instructions of this example embodiment may further comprise program instructions configured to generate a bit code representation of the histogram map based at least in part on the binary value of at least one of the one or more groups. As an additional example, in order to generate a context for at least one of the one or more histogram bins, the program instructions of this example embodiment may further comprise program instructions configured to skip generation of a context for the one or more histogram bins contained in a group assigned a binary value of zero. The program instructions of this example embodiment may further comprise program instructions configured to encode at least one of the one or more histogram bins of the histogram map based at least in part on the context associated with the respective histogram bin. Additionally, in order to encode at least one of the one or more histogram bins of the histogram map based at least in part on the context associated with the respective histogram bin, the program instructions of this example embodiment may further comprise program instructions configured to at least one of encode whether the respective histogram bin contains features based at least in part on the context and encode the number of features contained in the respective histogram bin based at least in part on the context. As another example, the first context value may comprise a count of the one or more neighboring bins located a first distance from the respective histogram bin containing one or more features, and the second context value may comprise a count of the one or more neighboring bins located a second distance from the respective histogram bin containing one or more features. In yet another example, the first context value may comprise a count of the number of features contained in the one or more neighboring bins located a first distance from the respective histogram bin, and the second context value may comprise a count of the number of features contained in the one or more neighboring bins located a second distance from the respective histogram bin.

In another example embodiment, an apparatus is provided, which comprises means for identifying one or more features of a source query image for a visual search; generating a histogram map comprising one or more histogram bins, wherein the histogram map represents the location of the one or more features of the source query image; and generating a context for at least one of the one or more histogram bins, wherein the context comprises a first context value based on information related to one or more neighboring bins located a first distance from the respective histogram bin and a second context value based on information related to one or more neighboring bins located a second distance from the respective histogram bin.

The apparatus may further comprise means for assigning a binary value of one to each of the one or more histogram bins containing one or more features; and assigning a binary value of zero to each of the one or more histogram bins containing no features. As another example, means for generating a histogram map may further comprise means for dividing the one or more histogram bins into one or more groups. Additionally, the apparatus may comprise means for assigning a binary value of one to each of the one or more groups containing at least one histogram bin containing one or more features; and assigning a binary value of zero to each of the one or more groups containing no histogram bins containing one or more features. The apparatus may further comprise means for generating a bit code representation of the histogram map based at least in part on the binary value of at least one of the one or more groups. As an additional example, means for generating a context for at least one of the one or more histogram bins may further comprise means for skipping generation of a context for the one or more histogram bins contained in a group assigned a binary value of zero. The apparatus may further comprise means for encoding at least one of the one or more histogram bins of the histogram map based at least in part on the context associated with the respective histogram bin. Additionally, means for encoding at least one of the one or more histogram bins of the histogram map based at least in part on the context associated with the respective histogram bin may further comprise at least one of means for encoding whether the respective histogram bin contains features based at least in part on the context and means for encoding the number of features contained in the respective histogram bin based at least in part on the context. As another example, the first context value may comprise a count of the one or more neighboring bins located a first distance from the respective histogram bin containing one or more features, and the second context value may comprise a count of the one or more neighboring bins located a second distance from the respective histogram bin containing one or more features. In yet another example, the first context value may comprise a count of the number of features contained in the one or more neighboring bins located a first distance from the respective histogram bin, and the second context value may comprise a count of the number of features contained in the one or more neighboring bins located a second distance from the respective histogram bin.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
   identifying one or more features of a source query image for a visual search;
   generating, with a processor, a histogram map comprising one or more histogram bins, wherein the histogram map represents the location of the one or more features of the source query image; and
   generating a context for at least one of the one or more histogram bins, wherein the context comprises a first context value based on information related to one or more neighboring bins located a first distance from the respective histogram bin and a second context value based on information related to one or more neighboring bins located a second distance from the respective histogram bin, wherein the first context value comprises a count of the one or more neighboring bins located a first distance front the respective histogram bin containing one or more features, and the second context value comprises a count of the one or more neighboring bins located a second distance front the respective histogram bin containing one or more features.

2. A method according to claim 1 further comprising:
   assigning a binary value of one to each of the one or more histogram bins containing one or more features; and
   assigning a binary value of zero to each of the one or more histogram bins containing no features.

3. A method according to claim 1 further comprising:
   dividing the one or more histogram bins into one or more or more groups;
   assigning a binary value of one to each of the one or more groups containing at least one histogram bin containing one or more features; and
   assigning a binary value of zero to each of the one or more groups containing at least one histogram bin containing no features.

4. A method according to claim 1 further comprising:
   generating a bit code representation of the histogram map based at least in part on a binary value of at least one of the one or more histogram bins.

5. A method according to claim 1 further comprising:
   encoding at least one of the one or more histogram bins of the histogram map based at least in part on the context associated with the respective histogram bin including both the first context value and the second context value.

6. The method according to claim 1 wherein the first context value comprises a count of the number of features contained in the one or more neighboring bins located a first distance from the respective histogram bin, and the second context value comprises a count of the number of features contained in the one or more neighboring bins located a second distance from the respective histogram bin.

7. A method according to claim 1, wherein the second distance is greater than the first distance, an wherein the second context value is based on information related to different neighboring bins than the neighboring bins upon which the first context value is based such that the second context value is not based on one or more neighboring bins located at the first distance from the respective histogram bin.

8. An apparatus comprising at least one processor and at least one memory including computer program code, the at least one memory and the computer program code configured to, with the processor, cause the apparatus to at least:
identify one or more features of a source query image for a visual search;
generate a histogram map comprising one or more histogram bins, wherein the histogram map represents the location of the one or more features of the source query image; and
generate a context for at least one of the one or more histogram bins, wherein the context comprises a first context value based on information related to one or more neighboring bins located a first distance from the respective histogram bin and a second context value based on information related to one or more neighboring bins located a second distance from the respective histogram bin, wherein the first context value comprises a count of the one or more neighboring bins located a first distance from the respective histogram bin containing one or more features, and the second context value comprises a count of the one or more neighboring bins located a second distance from the respective histogram bin containing one or more features.

9. An apparatus according to claim 8, wherein the at least one memory and the computer program code are further configured to, with the processor, cause the apparatus to:
assign a binary value of one to each of the one or more histogram bins containing one or more features; and
assign a binary value of zero to each of the one or more histogram bins containing no features.

10. An apparatus according to claim 8, wherein the at least one memory and the computer program code are further configured to, with the processor, cause the apparatus to:
divide the one or more histogram bins into one or more or more groups;
assign a binary value of one to each of the one or more groups containing at least one histogram bin containing one or more features; and
assign a binary value of zero to each of the one or more groups containing at least one histogram bin containing no features.

11. An apparatus according to claim 8, wherein the at least one memory and the computer program code are further configured to, with the processor, cause the apparatus to generate a bit code representation of the histogram map based at least in part on a binary value of at least one of the one or more histogram bins.

12. An apparatus according to claim 8, wherein the at least one memory and the computer program code are further configured to, with the processor, cause the apparatus to encode at least one of the one or more histogram bins of the histogram map based at least in part on the context associated with the respective histogram bin including both the first context value and the second context value.

13. An apparatus according to claim 8, wherein the first context value comprises a count of the number of features contained in the one or more neighboring bins located a first distance from the respective histogram bin, and the second context value comprises a count of the number of features contained in the one or more neighboring bins located a second distance from the respective histogram bin.

14. An apparatus according to claim 8, wherein the second distance is greater than the first distance, an wherein the second context value is based on information related to different neighboring bins than the neighboring bins upon which the first context value is based such that the second context value is not based on one or more neighboring bins located at the first distance from the respective histogram bin.

15. A computer program product comprising at least one non-transitory computer-readable storage medium having computer-executable program code portions stored therein, the computer-executable program code portions comprising program code instructions for:
identifying one or more features of a source query image for a visual search;
generating a histogram map comprising one or more histogram bins, wherein the histogram map represents the location of the one or more features of the source query image; and
generating a context for at least one of the one or more histogram bins,
wherein the context comprises a first context value based on information related to one or more neighboring bins located a first distance from the respective histogram bin and a second context value based on information related to one or more neighboring bins located a second distance from the respective histogram bin, wherein the first context value comprises a count of the one or more neighboring bins located a first distance from the respective histogram bin containing one or more features, and the second context value comprises a count of the one or more neighboring bins located a second distance from the respective histogram bin containing one or more features.

16. A computer program product according to claim 15, wherein the computer-executable program code portions further comprise program code instructions for:
assigning a binary value of one to each of the one or more histogram bins containing one or more features; and
assigning a binary value of zero to each of the one or more histogram bins containing no features.

17. A computer program product according to claim 15, wherein the computer-executable program code portions further comprise program code instructions for:
dividing the one or more histogram bins into one or more or more groups;
assigning a binary value of one to each of the one or more groups containing at least one histogram bin containing one or more features; and
assigning a binary value of zero to each of the one or more groups containing at least one histogram bin containing no features.

18. A computer program product according to claim 15, wherein the computer-executable program code portions further comprise program code instructions for:

generating a bit code representation of the histogram map based at least in part on a binary value of at least one of the one or more histogram bins.

19. A computer program product according to claim 15, wherein the computer-executable program code portions further comprise program code instructions for:
encoding at least one of the one or more histogram bins of the histogram map based at least in part on the context associated with the respective histogram bin including both the first context value and the second context value.

20. A computer program product according to claim 15, wherein the second distance is greater than the first distance, an wherein the second context value is based on information related to different neighboring bins than the neighboring bins upon which the first context value is based such that the second context value is not based on one or more neighboring bins located at the first distance from the respective histogram bin.

* * * * *